(12) United States Patent
Ferenczi et al.

(10) Patent No.: US 6,511,061 B1
(45) Date of Patent: Jan. 28, 2003

(54) FASTENER INJECTOR SYSTEM AND METHOD

(75) Inventors: Laszlo Ferenczi, Irving; Mark A. Turner, Arlington; James E. Woods, Dallas, all of TX (US)

(73) Assignee: VoughtAircraft Industries, Inc., Dallas, TX (US)

( * ) Notice: Subject to any disclaimer, the term of this patent is extended or adjusted under 35 U.S.C. 154(b) by 0 days.

(21) Appl. No.: 09/715,980

(22) Filed: Nov. 17, 2000

Related U.S. Application Data

(63) Continuation of application No. 09/178,024, filed on Oct. 23, 1998, now Pat. No. 6,196,414.

(51) Int. Cl.⁷ .............................................. B65E 59/00
(52) U.S. Cl. .................. 271/123; 221/258; 221/312 R; 221/268; 221/156; 227/109; 227/116; 227/119; 227/135
(58) Field of Search ................................ 221/123, 156, 221/163, 165, 232, 233, 234, 258, 278, 312 R, 268, 139, 93, 94; 227/107, 109, 114, 116, 119, 123, 135

(56) References Cited

U.S. PATENT DOCUMENTS

| | | |
|---|---|---|
| 520,451 A | 5/1894 | Ryno |
| 1,041,884 A * | 10/1912 | Sasseman .................... 227/119 |
| 1,181,292 A | 5/1916 | Cobley, Jr. et al. |
| 1,421,310 A | 6/1922 | Renaud |
| 1,635,865 A | 7/1927 | Stimpson |
| 2,359,861 A | 10/1944 | Koehler ....................... 10/163 |
| 3,033,337 A | 5/1962 | Haidegger .................... 193/31 |
| 3,297,199 A * | 1/1967 | Law ............................. 221/268 |
| 3,397,015 A | 8/1968 | Brosene, Jr. ................... 302/2 |
| 3,724,656 A | 4/1973 | Sterling ......................... 209/73 |
| 3,743,093 A | 7/1973 | Klancnik ....................... 209/80 |
| 4,101,054 A | 7/1978 | Frost et al. ................... 221/278 |
| 4,114,663 A | 9/1978 | Viner ...................... 221/278 X |
| 4,180,195 A * | 12/1979 | Coley et al. ................. 227/119 |
| 4,199,094 A | 4/1980 | Birkhofer et al. .............. 227/37 |
| 4,208,153 A | 6/1980 | Trethewy ................ 221/278 X |
| 4,278,184 A | 7/1981 | Willis ..................... 221/278 X |
| 4,278,194 A | 7/1981 | Ersoy ........................... 227/18 |
| 4,609,134 A * | 9/1986 | Davern ........................ 227/114 |
| 4,620,656 A | 11/1986 | McClay et al. ................. 227/5 |
| 4,645,112 A | 2/1987 | Davern et al. ............... 227/112 |
| 4,767,057 A * | 8/1988 | Muller ........................ 227/119 |
| 5,011,339 A * | 4/1991 | Aurtoi et al. ................ 221/278 |
| 5,014,876 A | 5/1991 | Young et al. ........... 221/278 X |
| 5,098,003 A * | 3/1992 | Young et al. ................ 227/114 |
| 5,310,064 A | 5/1994 | Neff et al. ................... 209/604 |
| 5,395,197 A | 3/1995 | Cario et al. .................. 411/442 |
| 5,465,868 A | 11/1995 | Bonomi ....................... 221/165 |
| 6,070,758 A | 6/2000 | Graham ................. 221/278 X |

FOREIGN PATENT DOCUMENTS

| | | | |
|---|---|---|---|
| EP | 0068857 | 1/1983 | ........... B21J/15/32 |
| EP | 0419886 | 4/1991 | ........... A44B/19/42 |
| EP | 4815586 | 4/1992 | ........... B21J/15/32 |
| EP | 0618022 | 10/1994 | ........... B21J/15/32 |

OTHER PUBLICATIONS

PCT Search Report dated Sep. 6, 2000.

* cited by examiner

Primary Examiner—H. Grant Skaggs
(74) Attorney, Agent, or Firm—Baker Botts L.L.P.

(57) ABSTRACT

A fastener injector (18) includes a plurality of tubes (86) operable to transfer a plurality of different sizes and types of fasteners (20) in a desired orientation. The injector also includes a receiver (88) operable to receive the fasteners (20) in the desired orientation from the tubes (86). The receiver (88) includes a plurality of receiver fingers (90) operable to receive the fasteners (20) from the tubes (86) and retain the fasteners (20) in the desired orientation. An injector blade (106) is operable to transfer the fasteners (20) in the desired orientation from the receiver (88) to a fastener installation device.

20 Claims, 5 Drawing Sheets

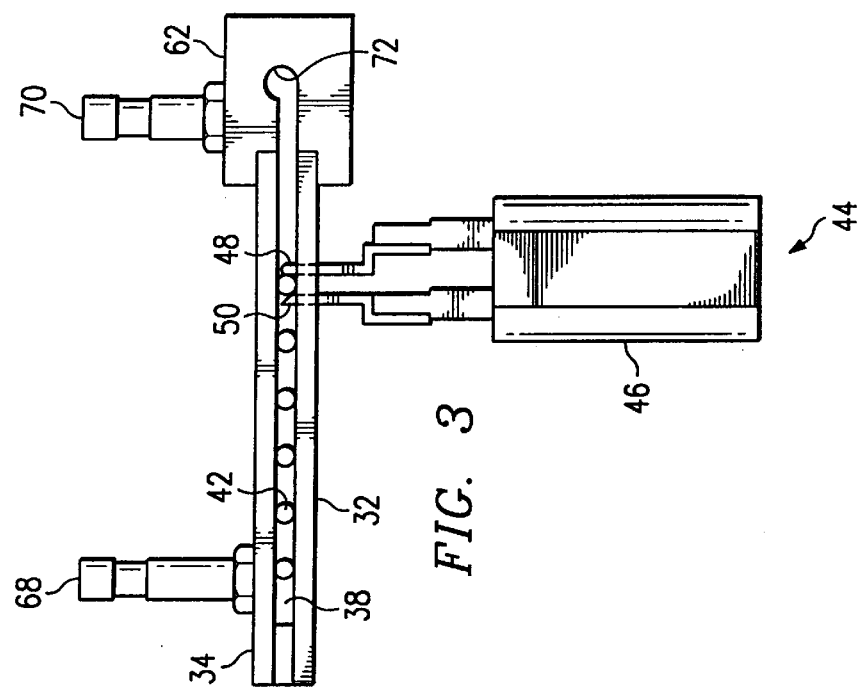
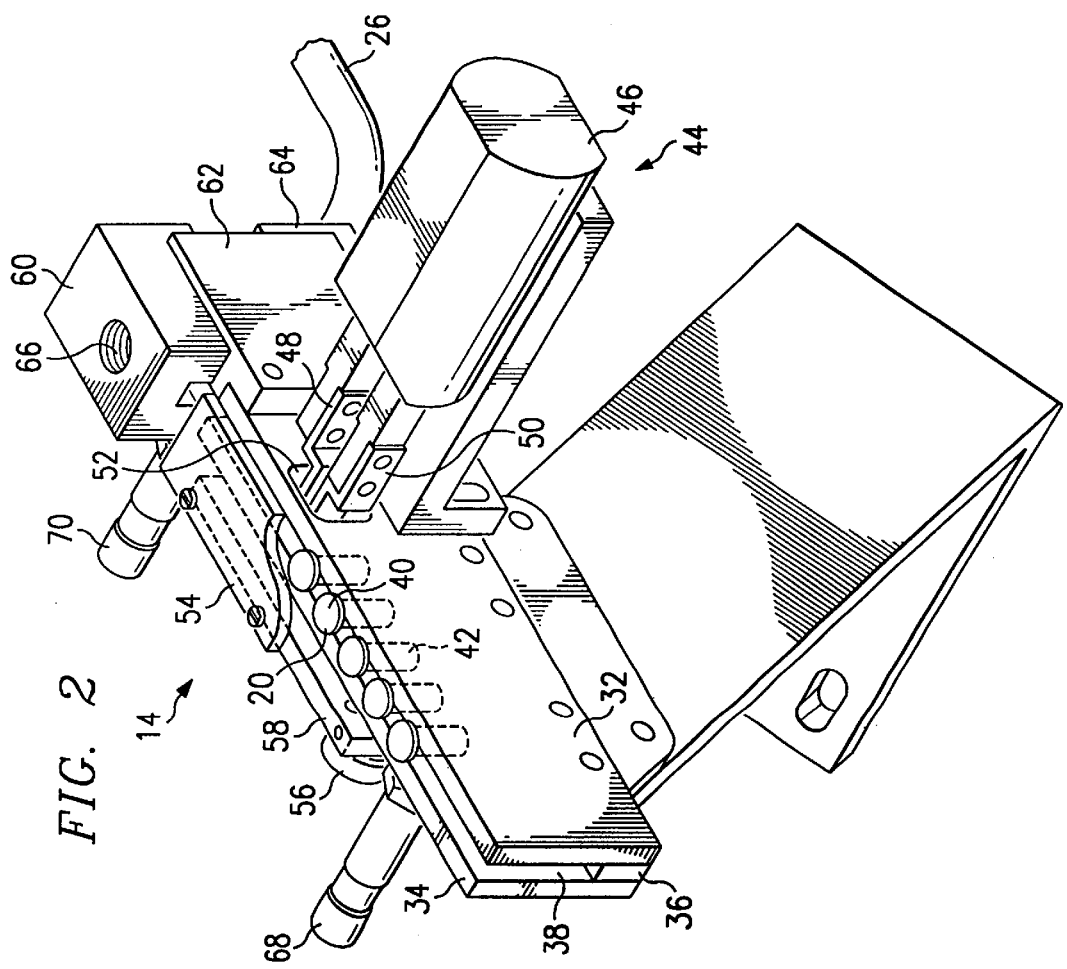

FASTENER INJECTOR SYSTEM AND METHOD

RELATED APPLICATIONS

This application is a continuation of U.S. application Ser. No. 09/178,024 filed Oct. 23, 1998, entitled "Fastener Injector System and Method," now U.S. Pat. No. 6,196,414. This application is also related to U.S. patent application Ser. No. 09/178,169, filed Oct. 23, 1998entitled "Orientation Maintained Fastener Delivery System and Method, and U.S. patent application Ser. No. 09/178,167, filed Oct. 23, 1998, entitled "Fastener Escapement System and Method."

TECHNICAL FIELD OF INVENTION

This invention relates generally to fastener delivery systems and, more particularly, to a fastener injector system and method.

BACKGROUND OF THE INVENTION

Fastener delivery systems are generally used to retrieve fasteners from a storage area and transport the fasteners to an automatic fastener installation device. One example of a fastener delivery system includes a feeder bowl, a tube, and a fastener injection device. The feeder bowl generally contains a large number of loosely contained fasteners. The fasteners exit the feeder bowl and enter the tube through a generally funnel-shaped device. A pneumatic power supply is generally used to transport the fasteners through the tube to the fastener injection device. The fastener injection device manipulates the fastener into an orientation capable of being received by the automatic fastener installation device and delivers the fastener to the automatic fastener installation device.

In mass production, several feeder bowls are often used so that a variety of sizes or types of fasteners may be transported to the fastener installation device to meet specific fastener installation requirements. For example, one feeder bowl containing one size of fastener may be replaced with another feeder bowl containing a different size fastener so that the same tube and injector can be used to accommodate a variety of fastener installation requirements. Accordingly, the tube and fastener injection device are generally designed to accommodate a variety of sizes or types of fasteners.

However, because the tube and fastener injection device are designed to accommodate a variety of sizes or types of fasteners, the orientation of the fastener is uncontrolled until the fastener reaches the fastener injection device. For example, the tube is generally designed having a diameter large enough to accommodate the largest sized fastener out of a variety of sizes or types of fasteners. Thus, the fastener is allowed to tumble loosely through the tube during transport from the feeder bowl to the fastener injection device. Once the fastener reaches the fastener injection device, the fastener must be manipulated into an orientation acceptable for being received by the fastener installation device and for installation.

However, manipulating each fastener after reaching the fastener injection device is time consuming and inefficient. For example, the fastener injection device may be unable to or incapable of manipulating the fastener into an acceptable installation orientation. As a result, the fastener must be purged from the fastener injection device and another fastener sent from the feeder bowl to complete the fastener installation sequence.

SUMMARY OF THE INVENTION

Accordingly, a need has arisen for an improved fastener injector system that provides increased fastener orientation control. The present invention provides an improved fastener injector system that addresses shortcomings of prior fastener injector systems and increases fastener orientation control.

According to one embodiment of the invention, a fastener injector includes a receiver operable to receive a plurality of different sizes and types of fasteners in a desired orientation. The injector also includes an injector blade operable to deliver the fasteners in the desired orientation from the receiver to a fastener installation device.

According to another embodiment of the invention, a method for delivering a plurality of different sizes and types of fasteners to a fastener installation device includes delivering the fasteners in a desired orientation to a receiver using a plurality of tubes. The method also includes transferring the fasteners in the desired orientation from the receiver to the fastener installation device using an injector blade.

The invention provides several technical advantages. For example, in one embodiment of the invention, receiving and maintaining a fastener in a desired orientation by the injector provides greater efficiency than prior fastener injectors by decreasing the amount of time required to manipulate the fastener into an acceptable installation orientation. In the same embodiment, the fastener injector provides greater flexibility than prior fastener injectors by accommodating a variety of sizes and types of fasteners.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 2 is a schematic drawing illustrating an enlarged isometric view of an escapement shown in the fastener delivery system of FIG. 1;

FIG. 3 is a schematic drawing illustrating a plan view of the escapement shown in FIG. 2;

DETAILED DESCRIPTION OF THE INVENTION

Embodiments of the present invention and its advantages are best understood by referring to FIGS. 1–7 of the drawings, like numerals being use for like and corresponding parts of the various drawings.

Figure 1:
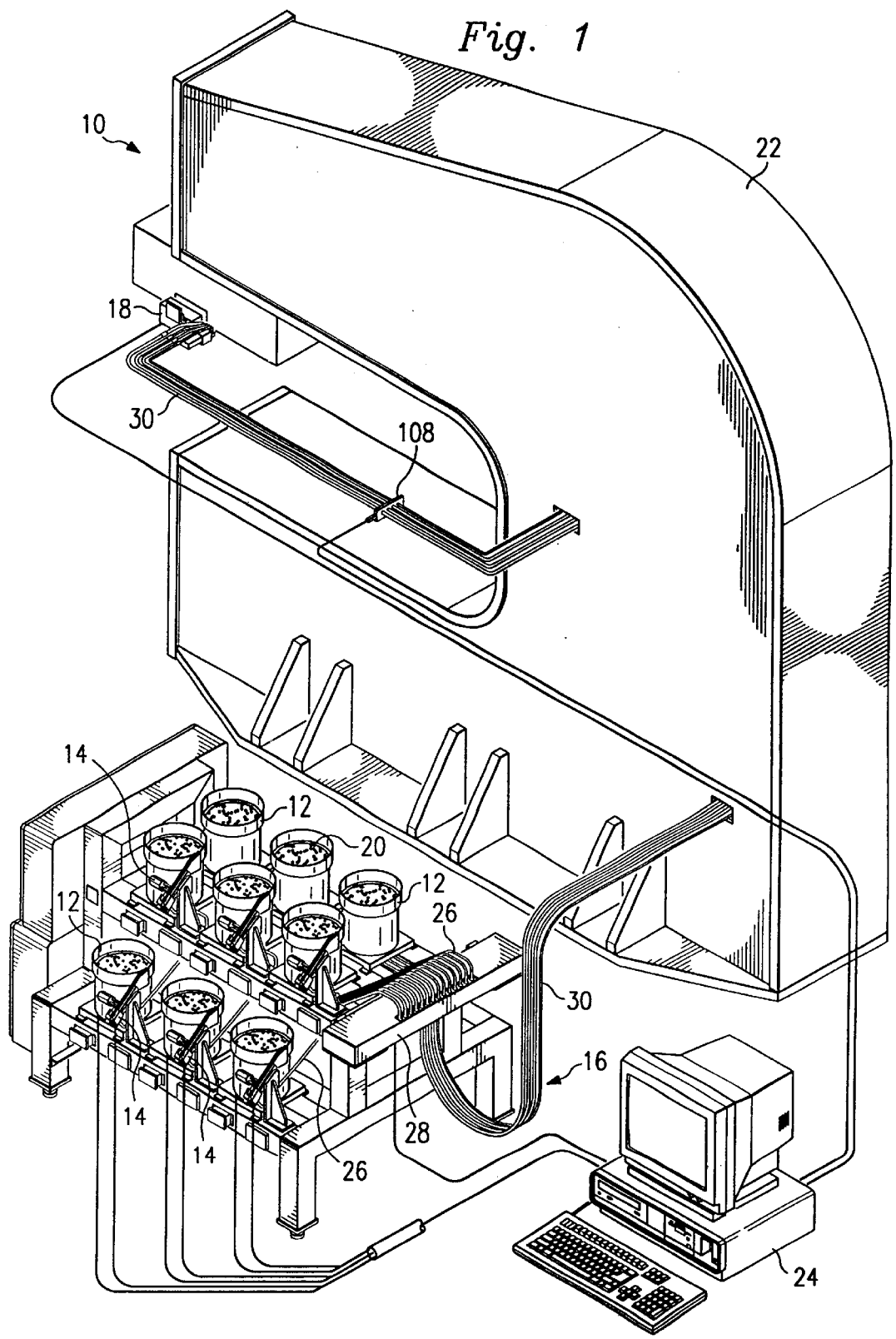
FIG. 1 is a schematic drawing illustrating an isometric view of a fastener delivery system constructed in accordance with the teachings of the present invention.

FIG. 1 is a schematic drawing illustrating an isometric view of a fastener delivery system 10 constructed in accordance with the teachings the present invention. The embodiment of fastener delivery system 10 illustrated in FIG. 1 includes a plurality of feeder bowls 12, a plurality of escapements 14, a transfer system 16, and an injector 18. Escapements 14 receive fasteners 20 from feeder bowls 12 and deliver fasteners 20 in a desired orientation to transfer system 16. Transfer system 16 transports fasteners 20 in the desired orientation from escapements 14 to injector 18. Injector 18 delivers fasteners 20 in the desired orientation to an automatic fastener installation device 22 for installing fasteners 20 in a variety of structures. Maintaining the desired orientation of fasteners 20 throughout fastener delivery system 10 will be described in greater detail in conjunction with FIGS. 2–7.

Fastener delivery system 10 also includes a controller or processor 24. Processor 24 comprises a computer, workstation, mini-computer, mainframe or other computing device for controlling operation of fastener delivery system 10. For example, as will be described further in conjunction with FIG. 2, processor 24 activates feeder bowls 12 to initiate delivery of fasteners 20 from feeder bowls 12 to escapements 14. In one embodiment, processor 24 includes a logic sequencer manufactured by Allen Bradley under part number PLC 5; however, other suitable equipment or devices may be used for processor 24. The logic sequences for controlling fastener delivery system 10 can be readily programmed by those having ordinary skill in the art.

As illustrated in FIG. 1, feeder bowls 12 of fastener delivery system 10 provide a storage or holding area for fasteners 20. Each feeder bowl 12 may include a different size or type of fastener 20 thereby providing increased flexibility of fastener delivery system 10 by allowing a variety of installation requirements to be met using fastener delivery system 10. For example, each feeder bowl 12 may contain a different length of the same type of fastener 20. The different types or sizes of fasteners 20 are entered or stored in processor 24 corresponding to feeder bowls 12 containing the particular sizes or types of fasteners 20. Depending on a particular installation requirement, fastener 20 may be selected from an appropriate feeder bowl 12 to meet the particular installation requirement. An example of feeder bowl 12 includes a 5/32 inch rivet bowl manufactured by Performance Feeders for Northrop Grumman Corporation under part number P-296351; however, other suitable storage or containment devices may be used as a storage or holding area for fasteners 20. Each feeder bowl 12 has an escapement 14 disposed adjacent an outlet (not explicitly shown) of feeder bowl 12 for receiving fasteners 20 from feeder bowl 12. In the embodiment described above, a vibrating motion of feeder bowl 12 causes fasteners 20 to exit the outlet of feeder bowl 12 and enter escapement 14. The operation of escapement 14 will be described in greater detail in conjunction with FIGS. 2 and 3.

Transfer system 16 of fastener delivery system 10 includes tubes 26, a distributor 28, and tubes 30. In operation, escapements 14 receive fasteners 20 from feeder bowls 12 and deliver fasteners 20 in the desired orientation to tubes 26 of transfer system 16. A power supply (not explicitly shown), such as a pneumatic or other suitable power supply, propels fasteners 20 in the desired orientation through tubes 26, distributor 28, and tubes 30 to injector 18. In one embodiment, tubes 26 and 30 are constructed using nylon tubing material; however, other suitable materials may be used to construct tubes 26 and 30. As will be described further in conjunction with FIGS. 4 and 5, distributor 28 aligns one of tubes 26 with one of tubes 30 depending upon a particular size or type of fastener 20 selected to meet a particular installation requirement.

FIG. 2 is a schematic drawing illustrating an enlarged isometric view of escapement 14 shown in FIG. 1. In the embodiment illustrated in FIG. 2, escapement 14 includes side plates 32 and 34 and a spacer 36. Spacer 36 is disposed between side plate 32 and side plate 34 creating a passage 38 between side plate 32 and side plate 34. Feeder bowl 12 delivers fasteners 20 into passage 38 of escapement 14 so that heads 40 of fasteners 20 are seated above side plates 32 and 34. Accordingly, shanks 42 of fasteners 20 are disposed within passage 38. Thus, fasteners 20 are positioned in a desired orientation within passage 38 of escapement 14 upon receipt from feeder bowls 12.

Escapement 14 also includes a regulator 44 for controlling the delivery of fasteners 20 from escapement 14 to transfer system 16. Regulator 44 includes a power supply 46, a release blade 48, and a stop blade 50. Release blade 48 and stop blade 50 extend into passage 38 through an opening 52 in side plate 32. In operation, release blade 48 and stop blade 50 extend and retract to regulate the delivery of fasteners 20 to tube 26 of transfer system 16. An example of regulator 44 includes a Dura-scape manufactured by R & I Manufacturing under model number BC-2B; however, other suitable methods or devices may be used to control the delivery of fasteners 20 to transfer system 16. The operation of release blade 48 and stop blade 50 of regulator 44 will be described in greater detail in conjunction with FIG. 3.

In the embodiment illustrated in FIG. 2, escapement 14 also includes a shield 54. Shield 54 is disposed above fasteners 20 and passage 38 to prevent foreign objects from entering passage 38 and to prevent fasteners 20 from exiting passage 38. For example, as best illustrated in FIG. 1, escapements 14 are disposed adjacent feeder bowls 12 at an angle so that gravity assists in moving or transporting fasteners 20 within passage 38 toward regulator 44. Accordingly, referring to FIG. 2, shield 54 prevents fasteners 20 from exiting or falling out of passage 38. In the embodiment illustrated in FIG. 2, a removable knob 56 and a shield bracket 58 are used to position shield 54 above fasteners 20 and passage 38. Knob 56 and shield bracket 59 provide for easy removal and replacement of shield 54 to perform such functions as inspecting, cleaning, purging, or the like, passage 38.

Escapement 14 shown in FIG. 2 also includes a power supply mounting bracket 60, a fastener drop 62, and a tube bracket 64. Power supply mounting bracket 60 provides a location for attaching a power supply (not explicitly shown) for propelling fasteners 20 through transfer system 16 to injector 18. The power supply, such as a pneumatic or other suitable power supply, may be attached to power supply mounting bracket 60 at opening 66. However, other methods of coupling the power supply to transfer system 16 may be used to transfer fasteners 20 from escapement 14 to injector 18.

Fastener drop 62 of escapement 14 is disposed below power supply mounting bracket 60 for receiving fasteners 20 from passage 38 and delivering fasteners 20 to transfer system 16 in the desired orientation. As illustrated in FIG. 2, tube 26 of transfer system 16 is attached to tube bracket 64 so that fasteners 20 are transferred from passage 38 to transfer system 16 through fastener drop 62. The operation of fastener drop 62 for delivering fasteners 20 to transfer system 16 in the desired orientation will be described in greater detail in conjunction with FIG. 3.

As illustrated in FIG. 2, fastener delivery system 10 also includes sensors 68 and 70 coupled to escapement 14. Sensor 68 initiates delivery of fasteners 20 from feeder bowls 12 to escapements 14. For example, sensor 68 is disposed adjacent passage 38 a predetermined distance from regulator 44 so that sensor 68 detects whether fasteners 20 are present within passage 38. If sensor 68 detects that additional fasteners 20 are required within passage 38, sensor 68 transmits a signal to processor 24 indicating the need for additional fasteners 20. In response, processor 24 activates feeder bowls 12 for the delivery of fasteners 20 to escapement 14. Additionally, when sensor 68 detects that an adequate supply of fasteners 20 are present within passage 38, sensor 68 transmits a signal to processor 24 indicating the receipt of an adequate supply of fasteners 20 within escapement 14. In response, processor 24 deactivates feeder bowls 12 to cease the delivery of additional fasteners 20 from feeder bowls 12 to escapement 14. One type of sensor 68 that may be used with fastener delivery system 10 is manufactured by Turck Incorporated under part number BI2U-M12-AN4X-H1141; however, other suitable sensors or indicating devices may be used. Therefore, fastener delivery system 10 provides for an automatic and efficient method of delivering fasteners 20 from feeder bowls 12 to escapements 14.

Additionally, sensor 68 may be used to notify a user of fastener delivery system 10 that feeder bowls 12 are empty, malfunctioning, or the like. For example, if sensor 68 detects that additional fasteners 20 are required within passage 38 of escapement 14, sensor 68 transmits a signal to processor 24 to activate feeder bowls 12 and initiate delivery of fasteners 20. A predetermined time period may be entered or stored in processor 24 so that if processor 24 does not receive a signal from sensor 68 indicating the receipt of an adequate supply of fasteners 20 within the predetermined time period, the user is notified that escapement 14 is not receiving fasteners 20. Thus, fastener delivery system 10 provides greater reliability than prior art fastener delivery systems by notifying the user of fastener delivery system 10 that fasteners 20 may not be available to perform additional installations.

Sensor 70 of fastener delivery system 10 activates the power supply for propelling fasteners 20 through transfer system 16 to injector 18. For example, after regulator 44 releases a single fastener 20 from passage 38, sensor 70 detects fastener 20 entering fastener drop 62. Once sensor 70 detects fastener 20 entering fastener drop 62, sensor 70 transmits a signal to processor 24 indicating the passage of fastener 20. In response, processor 24 activates the power supply for propelling fastener 20 through transfer system 16 to injector 18. One type of sensor 70 that may be used with fastener delivery system 10 is manufactured by Turck Incorporated under part number BI2U-M12-AN4X-H1141; however, other suitable sensors or indicating devices may be used. Thus, fastener delivery system 10 provides for an automatic and efficient method of transporting fasteners 20 by activating the power supply when fastener 20 enters fastener drop 62.

Sensor 70 may also be used to notify the user of fastener delivery system 10 that fastener 20 did not enter fastener drop 62. For example, a predetermined time period may be entered or stored in processor 24 associated with regulator 44 and sensor 70. After regulator 44 releases a single fastener 20 from passage 38, sensor 70 may transmit a signal to processor 24 indicating that fastener 20 did not enter fastener drop 62 within the predetermined time period. Thus, fastener delivery system 10 provides greater reliability than prior art fastener delivery systems by verifying that fastener 20 has been delivered to transfer system 16.

As previously described with reference to FIG. 1, a variety of sizes and types of fasteners 20 may be used with fastener delivery system 10. Accordingly, referring to FIG. 2, escapement 14 may be constructed to accommodate a variety of types and sizes of fasteners 20. For example, spacer 36 disposed between side plates 32 and 34 may be increased or deceased in thickness to increase or decrease, respectively, the width of passage 38 as measured from side plate 32 to side plate 34. Accordingly, each escapement 14 constructed to accommodate a particular size or type of fastener 20 is disposed adjacent a corresponding feeder bowl 12 containing the particular type or size of fastener 20. Thus, escapements 14 provide greater flexibility than prior art fastener delivery systems by accommodating a variety of sizes and types of fasteners 20.

FIG. 3 is a schematic drawing illustrating a plan view of escapement 14 shown in FIG. 2 with portions broken away. As illustrated in FIG. 3, ends of release blade 48 and stop blade 50 are disposed within passage 38 for regulating the delivery of fasteners 20 to fastener drop 62. Shanks 42 of fasteners 20 are illustrated within passage 38 of FIG. 3 for clarification of the operation of regulator 44.

In operation, release blade 48 and stop blade 50 retain fasteners 20 within passage 38 of escapement 14 until the user of fastener delivery system 10 initiates an installation sequence. Upon initiation of the installation sequence, power supply 46 retracts release blade 48 thereby releasing a single fastener 20 from passage 38. As best illustrated in FIG. 1, since escapements 14 are disposed at a downward angle adjacent feeder bowls 12, gravitational forces cause the single fastener 20 to exit passage 38 and enter fastener drop 62. Referring to FIG. 3, while release blade 48 is retracted, stop blade 50 is maintained in an extended position thereby preventing additional fasteners 20 from exiting passage 38 and entering fastener drop 62.

After the single fastener 20 has been released to fastener drop 62, power supply 46 extends release blade 48 into passage 38 and retracts stop blade 50, thereby allowing another fastener 20 to travel downwardly within passage 38 toward release blade 48. Once another fastener 20 has been located adjacent release blade 48, power supply 46 extends stop blade 50 into passage 38 to prevent additional fasteners 20 from exiting passage 38 upon initiation of the next installation sequence.

Stop blade 50 of regulator 44 is disposed a predetermined distance from release blade 48 within passage 38 to accommodate a particular type or size of fastener 20. For example, the predetermined distance is selected so that the predetermined distance accommodates only a single fastener 20 between release blade 48 and stop blade 50. Accordingly, locating stop blade 50 the predetermined distance from release blade 48 provides that only a single fastener 20 will exit passage 38 and enter fastener drop 62 upon the retraction of release blade 48.

As illustrated in FIG. 3, fastener drop 62 includes an opening 72 for delivery of fasteners 20 to transfer system 16. As best shown in FIG. 2, opening 72 is connected to tube 26 through tube bracket 64. Referring to FIG. 3, opening 72 is constructed generally offset from a center line of passage 38 so that shanks 42 enter transfer system 16 first. For example, opening 72 is constructed large enough to accommodate heads 40 of fasteners 20. However, gravitational forces may cause fasteners 20 to flip or turn downward as fasteners 20 enter opening 72, thereby causing heads 40 of fasteners 20 to enter transfer system 16 first. As will be described in greater detail in conjunction with FIG. 6, having heads 40 of fasteners 20 enter transfer system 16 first causes fasteners 20 to be delivered to injector 18 in an orientation that may be unacceptable for a particular type of automatic fastener installation device 22.

However, since opening 72 is constructed generally offset from the center line of passage 38, centrifugal forces act upon fasteners 20 as fasteners 20 reach opening 72 and prevent heads 40 of fasteners 20 from entering transfer system 16 first. For example, fasteners 20 are supported within passage 38 by heads 40 of fasteners 20. As fasteners 20 enter fastener drop 62, centrifugal forces acting upon fasteners 20 cause fasteners 20 to travel around the circumference of opening 72 while a portion of head 40 of fastener 20 remains supported by an upper surface of fastener drop 62. While a portion of head 40 remains supported by the upper surface of fastener drop 62, shank 42 of fastener 20 becomes positioned within opening 72, thereby preventing head 40 of fastener 20 from entering opening 72 first. Therefore, the desired orientation of fastener 20 to accommodate automatic fastener installation device 22 is maintained by ensuring that shank 42 of fastener 20 enters transfer system 16 first. Therefore, upon activation of the power supply to propel fastener 20 through transfer system 16 to injector 18, fastener 20 is transported to injector 18 in the desired orientation.

Figure 4:
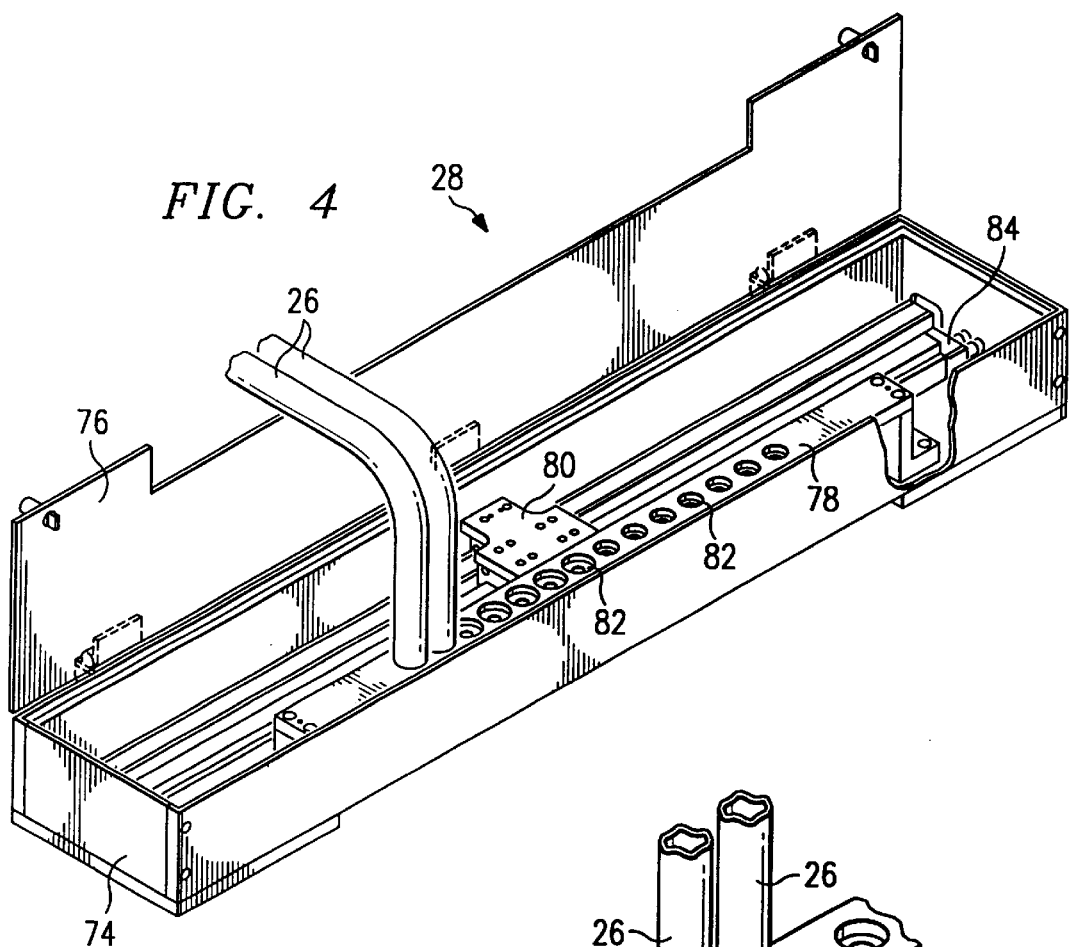
FIG. 4 is a schematic drawing illustrating an enlarged isometric view of a distributor shown in the fastener delivery system of FIG. 1.

FIG. 4 is an enlarged isometric view with portions broken away illustrating distributor 28 of transfer system 16 shown in FIG. 1. Distributor 28 includes a housing 74 and a cover 76. Distributor 28 also includes a manifold 78 and a transfer plate 80. Manifold 78 is disposed within housing 74 and includes openings 82 for coupling to tubes 26. Each opening 82 is constructed to accommodate a particular size tube 26 depending on the type or size of fastener 20 transported within tube 26. As best illustrated in FIG. 1, the opposite ends of tubes 26 are coupled to escapements 14.

Referring to FIG. 4, transfer plate 80 of distributor 28 is disposed beneath manifold 78 for movement along the length of manifold 78. In one embodiment of the invention, a power supply (not explicitly shown) is provided for translating transfer plate 80 along the length of manifold 78 using a track 84; however, other suitable materials or methods may be used to provide movement of transfer plate 80 with respect to manifold 78. Cover 76 of distributor 28 prevents foreign objects from entering housing 74 and interfering with the movement of transfer plate 80. The transfer of fasteners 20 from tubes 26 to tubes 30 of transfer system 16 will be further described in conjunction with FIG. 5.

Figure 5:
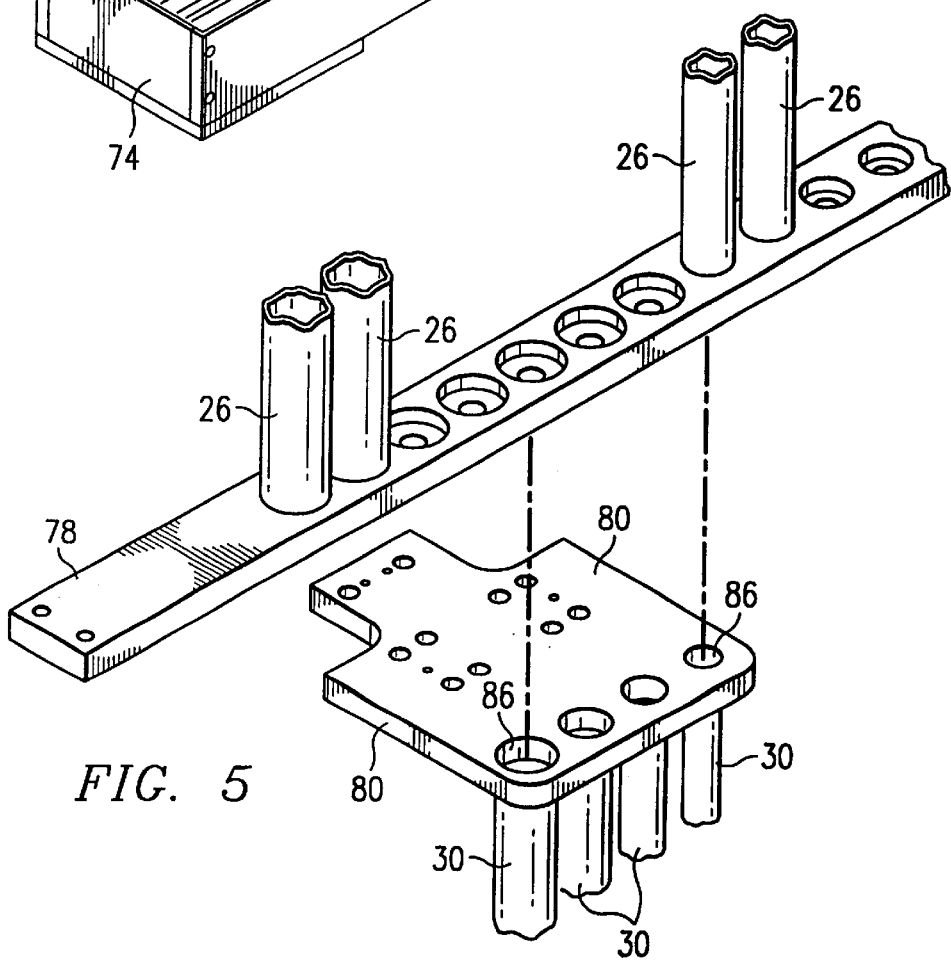
FIG. 5 is a schematic drawing illustrating an exploded assembly view of the distributor shown in FIG. 4.

FIG. 5 is an exploded isometric view of portions of distributor 28 shown in FIG. 4 illustrating the cooperation of manifold 78 and transfer plate 80. Tubes 30 of transfer system 16 are coupled to transfer plate 80 at openings 86. In operation, transfer plate 80 translates along the length of manifold 78 and aligns a single tube 30 with a single tube 26 so that fasteners 20 may be transported to injector 18. For example, each feeder bowl 12 may contain a different size or type of fastener 20 to be transported to automatic fastener installation device 22. Accordingly, tubes 26 are constructed to accommodate the different sizes or types of fasteners 20 while maintaining the desired orientation of fastener 20, thereby preventing fasteners 20 from tumbling freely within tubes 26. Tubes 30 are also constructed so that each tube 30 can accommodate fasteners 20 from one or more tubes 26 while maintaining the desired orientation of fasteners 20, thereby preventing fasteners 20 from tumbling freely within tubes 30. For example, as best illustrated in FIG. 1, fourteen tubes 26 are shown coupled to manifold 78 of distributor 28, and four tubes 30 are shown exiting distributor 28. Thus, each tube 30 is constructed to accommodate a particular size, type, range of sizes, or range of types of fasteners 20 received from tubes 26.

In operation, transfer plate 80 translates along the length of manifold 78 to align a particular tube 30 with a corresponding tube 26 so that the desired orientation of fastener 20 is maintained throughout transfer system 16. For example, a user of fastener delivery system 10 selects a particular type or size of fastener 20 to perform an installation requirement using processor 24. Depending on the type or size of fastener 20 selected, processor 24 transmits a signal to distributor 28 to align tube 26 corresponding to the type or size of fastener 20 selected with a corresponding tube 30. Therefore, fastener delivery system 10 provides greater flexibility than prior fastener delivery systems by accommodating a variety of types and sizes of fasteners 20.

Figure 6:
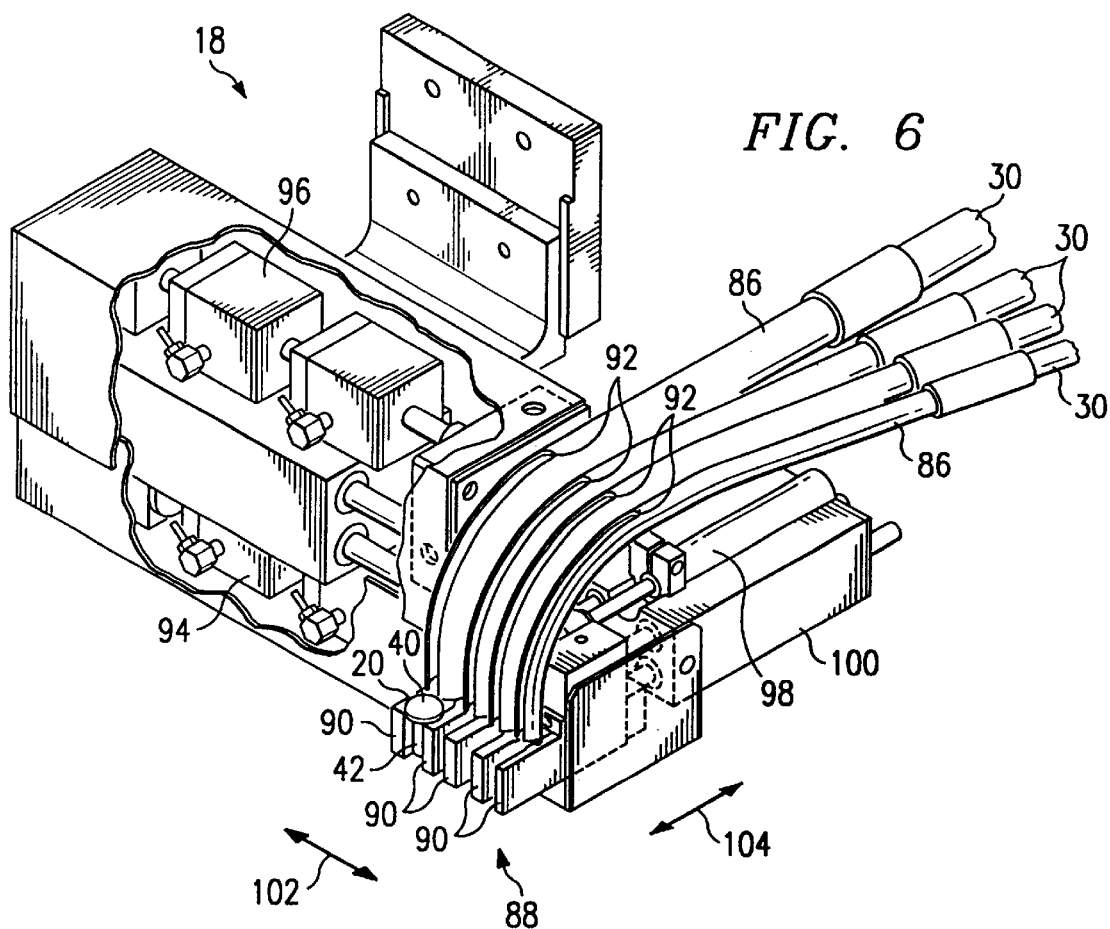
FIG. 6 is a schematic drawing illustrating an enlarged isometric view of an injector shown in the fastener delivery system of FIG. 1.

FIG. 6 is an enlarged isometric view with portions broken away of injector 18 shown in FIG. 1. Injector 18 includes feeder tubes 86 for receiving fasteners 20 from tubes 30 of transfer system 16. Feeder tubes 86 of injector 18 are constructed to maintain the desired orientation of fasteners 20 as fasteners 20 travel through feeder tubes 86. For example, as illustrated in FIG. 6, each feeder tube 86 may be constructed to accommodate a different size, type, range of sizes, or range of types of fastener 20 while maintaining the desired orientation of fastener 20, thereby preventing fasteners 20 from tumbling freely within feeder tubes 86.

Injector 18 also includes a receiver 88 for receiving fasteners 20 from feeder tubes 86. Receiver 88 includes a plurality of receiver fingers 90 for supporting and maintaining fastener 20 in the desired orientation. For example, as illustrated in FIG. 6, head 40 of fastener 20 rests on upper surfaces of two adjacent receiver fingers 90 while shank 42 of fastener 20 is disposed between adjacent receiver fingers 90.

In operation, fasteners 20 are propelled through transfer system 16, into feeder tubes 86, and downward through feeder tubes 86 to receiver 88. Feeder tubes 86 include slots 92 for aligning shank 42 of fastener 20 between adjacent receiver fingers 90 as fastener 20 travels downward through feeder tubes 86 toward receiver 88. For example, centrifugal forces cause shank 42 of fastener 20 to follow slot 92 of feeder tube 86 as fastener 20 travels downwardly through feeder tubes 86 toward receiver 88. Accordingly, when fastener 20 reaches receiver 88, shank 42 of fastener 20 is aligned between adjacent receiver fingers 90.

Injector 18 also includes power supplies 94, 96, 98, and 100. Power supplies 94, 96, 98 and 100 may comprise pneumatic power supplies or may include other suitable types of power supplies. Power supply 94 is coupled to receiver 88 to provide translating movement of receiver 88 in the direction indicated by arrows 102 so that fasteners 20 disposed between receiver fingers 90 are aligned with a receiving mechanism (not explicitly shown) of automatic fastener installation device 22. For example, the receiving mechanism of automatic fastener installation device 22 is generally located in a fixed position with respect to injector 18. However, depending upon a specific installation requirement, injector 18 may receive fasteners 20 from any one of feeder tubes 86. Accordingly, fasteners 20 are aligned with the receiving mechanism of automatic fastener installation device 22 by translating receiver 88 into alignment with the receiving mechanism of automatic fastener installation device 22.

Power supply 96 is coupled to feeder tubes 86 to provide translating movement of feeder tubes 86 in the direction indicated by arrows 102 so that fasteners 20 exiting feeder tubes 86 toward receiver 88 are aligned between corresponding receiver fingers 90. For example, as described above, receiver 88 is translated in the direction indicated by arrows 102 to align fasteners 20 with the receiving mechanism of automatic fastener installation device 22. Accordingly, feeder tubes 86 are translated in the direction indicated by arrows 102 to correspond to the location of receiver 88. For example, feeder tubes 86 and the distance between adjacent receiver fingers 90 are constructed to accommodate a variety of types and sizes of fasteners 20 while maintaining the desired orientation of fasteners 20. Accordingly, each feeder tube 86 will have a corresponding pair of receiver fingers 90 for receiving fasteners 20 for maintaining the desired orientation of fasteners 20. Thus, power supply 96 translates feeder tubes 86 to align a particular feeder tube 86 with a corresponding pair of receiver fingers 90.

Power supply 98 is coupled to receiver 88 to provide translating movement of receiver 88 in the direction indicated by arrows 104. As illustrated in FIG. 6, receiver 88 is shown having receiver fingers 90 disposed beneath feeder tubes 86. Power supply 98 functions to retract receiver 88 from beneath feeder tubes 86 so that the exit of each feeder tube 86 is clear of receiver fingers 90. For example, a user may purge fastener delivery system 10 of foreign debris, incorrectly specified fasteners 20, or the like, by retracting receiver 88 using power supply 98 and activating the power supply used to propel fasteners 20 through transfer system 16. Once the purging operation is complete, power supply 98 extends receiver 88 to a position beneath feeder tubes 86 in preparation for the next installation sequence. Thus, fastener delivery system 10 provides for an efficient method of purging fastener delivery system 10.

Figure 7:
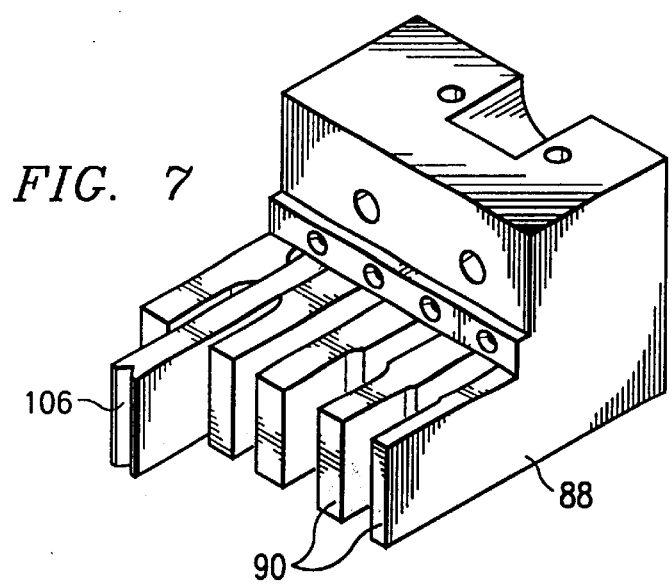
FIG. 7 is a schematic drawing illustrating an injector blade of the injector shown in FIG. 6.

FIG. 7 is an enlarged isometric view of receiver 88 shown in FIG. 6. As best illustrated in FIG. 7, the distance between adjacent receiver fingers 90 may be varied to accommodate a variety of sizes and types of fasteners 20. Injector 18 also includes injector blades 106 disposed between adjacent receiver fingers 90 for delivering fasteners 20 from receiver 88 to the receiving mechanism of automatic fastener installation device 22. For clarity, only a single injector blade 106 is shown in FIG. 7.

Referring to FIGS. 6 and 7, power supply 100 is coupled to injector blades 106 for extending and retracting injector blades 106 between receiver fingers 90 in the direction indicated by arrows 104. For example, power supply 100 extends injector blades 106 from between receiver fingers 90 to deliver fastener 20 from receiver 88 to the receiving mechanism of automatic fastener installation device 22. Once fastener 20 has been delivered to automatic fastener installation device 22, power supply 100 retracts injector blades 106 in preparation for receiving another fastener 20. Therefore, the desired orientation of fastener 20 is maintained from receiver 88 to automatic fastener installation device 22.

Referring to FIG. 7, injector 18 may be constructed so that a single injector blade 106 may be extended and retracted, or injector 18 may be constructed so that all injector blades 106 extend and retract together. For example, injector 18 may be constructed so that any fasteners 20 disposed between any receiver fingers 90 are purged from receiver 88 by extending all injector blades simultaneously. Thus, injector 18 provides a method of purging fasteners 20 from between receiver fingers 90 of receiver 88.

Referring to FIG. 1, the operation of fastener delivery system 10 will be briefly described. To meet a specific fastener 20 installation requirement, a user of fastener delivery system 10 selects a particular type or size of fastener 20 using processor 24. Upon the selection of the particular type or size of fastener 20, distributor 28 aligns one of tubes 26 with one of tubes 30 so that the particular fastener 20 may be transported from one of feeder bowls 12 containing the particular fastener 20 to injector 18. When the user is ready to initiate installation of fastener 20, using the processor 24, the user activates regulator 44, as best shown in FIG. 2, to release the particular fastener 20 from escapement 14.

After the particular fastener 20 is released from regulator 44 of escapement 14, as the particular fastener 20 passes sensor 68, a power supply, such as a pneumatic power supply or other suitable power supply, is activated to propel the particular fastener 20 through transfer system 16 to injector 18. Accordingly, the particular fastener 20 enters opening 72 of fastener drop 62 and is propelled through tube 26, distributor 28, tube 30, to injector 18. Referring to FIG. 1, fastener delivery system 10 may also include a sensor 108 for deactivating the power supply used for propelling fastener 20 through transfer system 16. For example, sensor 108 may be associated with tubes 30 near injector 18 so that when sensor 108 detects the passage of fastener 20 through tubes 30, sensor 108 transmits a signal to processor 24 indicating that fastener 20 has been delivered to injector 18. In response to the signal received from sensor 108, processor 24 deactivates the power supply for propelling fastener 20 through transfer system 16. One type of sensor 108 that may be used with fastener delivery system 10 is manufactured by Turck Incorporated under part number BI40-R325R-UN6X; however, other suitable sensors or indicating devices may be used.

Once the particular fastener 20 reaches injector 18, injector blades 106 extend to deliver the particular fastener 20 from receiver 88 of injector 18 to the receiving mechanism of automatic fastener installation device 22. Therefore, fastener delivery system 10 provides an efficient and reliable method of delivering fasteners 20 in a desired orientation to automatic fastener installation device 22, thereby decreasing the time required to install fasteners 20. The operation of fastener delivery system 10 may be controlled by a user or operated in a completely automatic way without the need for user intervention. Some combination of user controlled and automatic operation is within the skill of the art.

Figure 8:
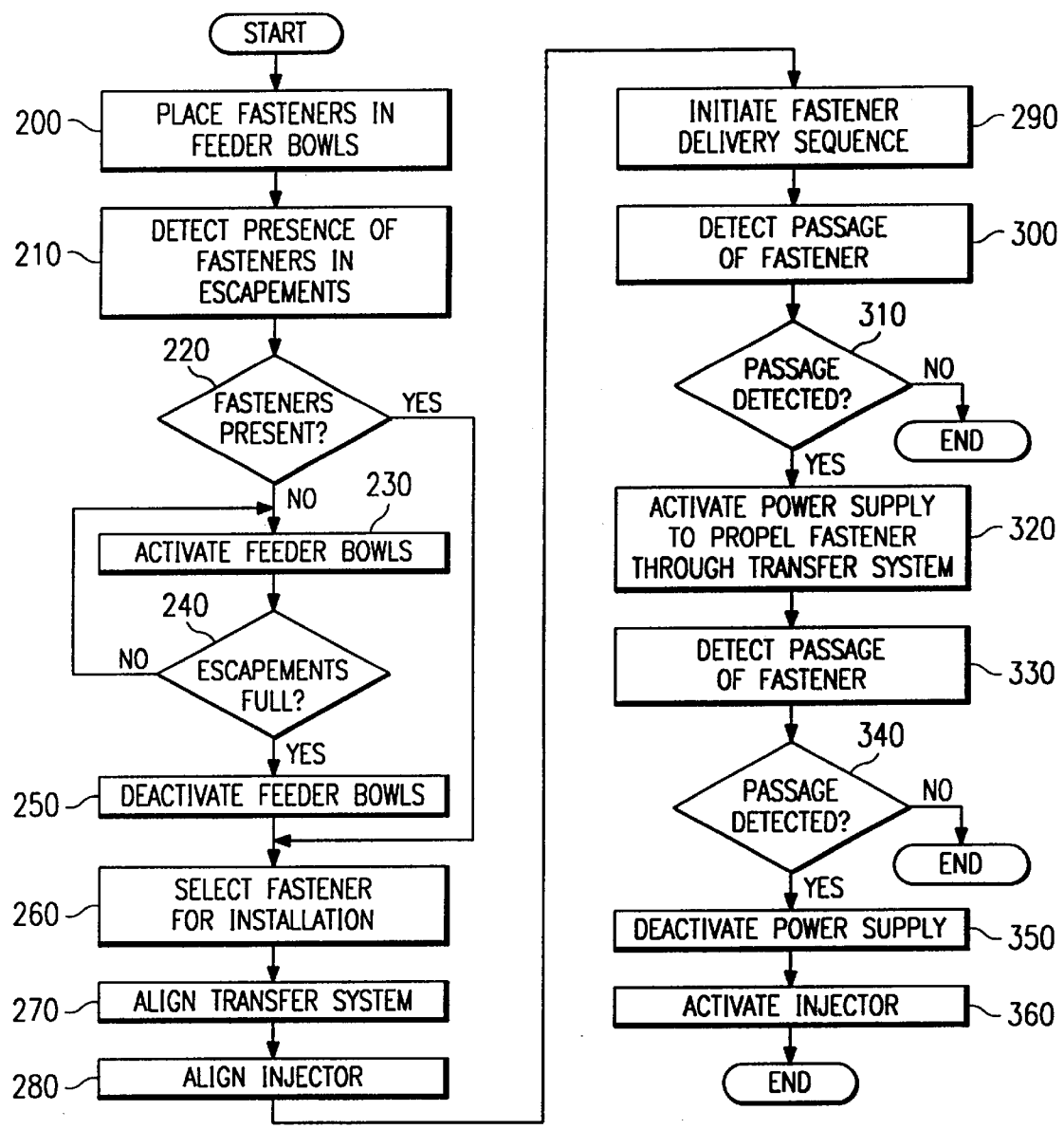
FIG. 8 is a flow chart illustrating the steps performed in accordance with the method of the present invention.

FIG. 8 illustrates a flow chart of a method for delivering fasteners 20 in a desired orientation to automatic fastener installation device 22 according to the present invention. Fasteners 20 are placed in feeder bowls 12 at step 200. Each feeder bowl 12 may contain a different type or size of fastener 20 to accommodate various installation requirements.

Fastener delivery system 10 determines whether fasteners 20 are present within escapements 14 at step 210. Sensor 68 coupled to escapements 14 detects whether additional fasteners 20 are required within passage 38 of escapements 14 at step 220. If additional fasteners 20 are required, the method proceeds to step 230. If no additional fasteners 20 are required, the method proceeds to step 260.

Sensor 68 transmits a signal to processor 24 indicating that additional fasteners 20 are required within escapements 14 at step 230. In response, processor 24 activates feeder bowls 12 to initiate delivery of fasteners 20 from feeder bowls 12 to escapements 14. Sensor 68 continues to detect whether additional fasteners 20 are required within passage 38 of escapements 14 at step 240. If additional fasteners 20 are required within passage 38 of escapements 14, the method proceeds to step 230. If no additional fasteners 20 are required within passage 38 of escapements 14, the method proceeds to step 250.

Sensor 68 transmits a signal to processor 24 indicating that no additional fasteners 20 are required within escapements 14 at step 250. In response, processor 24 deactivates feeder bowls 12 to cease the delivery of additional fasteners 20 from feeder bowls 12 to escapements 14.

A user of fastener delivery system 10 selects a particular type or size of fastener 20 at step 260 as required to meet a particular installation requirement. For example, processor 24 may include a display representing the types and sizes of fasteners 20 available in each feeder bowl 12. By selecting a particular type or size of fastener 20 or feeder bowl 12, the user may initiate the installation sequence to meet the required installation requirement using automatic fastener installation device 22. Alternatively, the type and size of fastener 20 may be pre-programmed with processor 24 as is well known to those skilled in the art.

Based on the fastener 20 or feeder bowl 12 selected at step 260, fastener delivery system 10 aligns transfer system 16 at step 270. For example, distributor 28 aligns one of tubes 26 coupled to the selected escapement 14 and feeder bowl 12 with one of tubes 30 so that the desired orientation of fastener 20 is maintained throughout transfer system 16. For example, since each tube 30 is constructed to accommodate a variety of types or sizes of fasteners 20 while maintaining a desired orientation of fastener 20, fastener delivery system 10 aligns a corresponding tube 30 based on the type or size of fastener 20 selected at step 260.

Based on the fastener 20 or feeder bowl 12 selected at step 260, fastener delivery system 10 also aligns injector 18 at step 280. For example, since feeder tubes 86 and the distance between receiver fingers 90 of injector 18 are constructed to accommodate a variety of sizes or types of fasteners 20 while maintaining a desired orientation of fastener 20, fastener delivery system 10 aligns receiver fingers 90 and one of feeder tubes 86 corresponding to the type or size fastener 20 selected at step 260 with the receiving mechanism of automatic fastener installation device 22. As best shown in FIG. 6, fastener delivery system 10 aligns receiver fingers 90 and feeder tubes 86 in the direction indicated by arrows 102.

Referring to FIG. 8, fastener delivery system 10 initiates delivery of fastener 20 to automatic fastener installation device 22 at step 290. For example, power supply 46 of regulator 44 retracts release blade 48 thereby releasing a single fastener 20 from passage 38 of escapement 14.

Fastener delivery system 10 detects the passage of the single fastener 20 from passage 38 of escapement 14 to fastener drop 62 at step 300. Sensor 70 of fastener delivery system 10 detects the passage of the single fastener 20 entering fastener drop 62 at step 310. If sensor 70 detects the passage of the single fastener 20, sensor 70 transmits a signal to processor 24 indicating the passage of the single fastener 20 and the method proceeds to step 320. If sensor 70 does not detect the passage of the single fastener 20 entering fastener drop 62, sensor 70 transmits a signal to processor 24 indicating that the single fastener 20 did not enter fastener drop 62, thereby notifying the user of fastener delivery system 10 that the installation sequence cannot proceed.

In response to receiving the signal from sensor 70 that a single fastener 20 has entered fastener drop 62, processor 24 transmits a signal activating the power supply for propelling the single fastener 20 through transfer system 16 at step 320. Fastener delivery system 10 detects the passage of the single fastener 20 through transfer system 16 using sensor 108 at step 330. If sensor 108 detects the passage of the single fastener 20 through transfer system 16, sensor 108 transmits a signal to processor 24 indicating the passage of the single fastener 20 at step 340 and the method proceeds to step 350. If sensor 108 does not detect the passage of the single fastener 20 through transfer system 16, sensor 108 transmits a signal to processor 24 indicating that the single fastener 20 was not transferred through transfer system 16, thereby notifying the user of fastener delivery system 10 that the installation sequence cannot proceed.

In response to receiving the signal from sensor 108 that the single fastener 20 has been transferred through transfer system 16, processor 24 transmits a signal to deactivate the power supply used to propel the single fastener 20 through transfer system 16 at step 350. At this point, the single fastener 20 is disposed between adjacent receiver fingers 90 of injector 18. Fastener delivery system 10 activates injector 18 to deliver the single fastener 20 from injector 18 to the receiving mechanism of automatic fastener installation device 22 at step 360. Fastener delivery system 10 extends injector blades 106 of injector 18 thereby delivering the single fastener 20 to automatic fastener installation device 22. Fastener delivery system 10 then retracts injector blades 106 after delivering the single fastener 20 to automatic fastener installation device 22 in preparation for the next installation sequence.

Although the present invention and its advantages have been described in detail, it should be understood that various changes, substitutions, and alterations, can be made therein without departing from the spirit and scope of the present invention as defined by the appended claims.

What is claimed is:

1. A fastener injector comprising:
    a receiver having a first receiver slot and a second receiver slot, each of the first and second receiver slots formed by spaced apart receiver fingers, the spacing between the receiver fingers forming the first receiver slot different than the spacing between the receiver fingers forming the second receiver slot for receiving different sizes and types of fasteners in a desired orientation in each of the first and second receiver slots; and
    a plurality of injector blades operable to extend into the first and second receiver slots to deliver the fasteners in the desired orientation from the receiver to a fastener installation device.

2. The injector of claim 1, further comprising a plurality of feeder tubes operable to deliver the fasteners in the desired orientation to the receiver.

3. The injector of claim 2, further comprising a power supply operable to align one of the feeder tubes with one of the first and second receiver slots.

4. The injector of claim 1, further comprising a plurality of feeder tubes operable to deliver the fasteners in the desired orientation to the receiver, wherein each feeder tube includes a slot operable to align the fasteners with the first and second receiver slots.

5. The injector of claim 1, further comprising a power supply operable to extend the plurality of injector blades to deliver the fasteners to the fastener installation device.

6. The injector of claim 1, further comprising:
    a plurality of feeder tubes each having an exit disposed adjacent the receiver; and
    a power supply operable to move the receiver from adjacent the exit of the feeder tubes such that the exit of the feeder tubes is clear of the receiver.

7. The injector of claim 1, further comprising a power supply operable to align one of the first and second receiver slots with the fastener installation device.

8. The injector of claim 1, further comprising:
a plurality of feeder tubes operable to deliver the fasteners to the receiver;
a first power supply operable to move the tubes to align one of the tubes with one of the first and second receiver slots; and
a second power supply operable to move the receiver to align one of the first and second receiver slots with the fastener installation device.

9. A method for delivering a plurality of different sizes and types of fasteners to a fastener installation device, the method comprising:
delivering the fasteners in a desired orientation to a receiver using a plurality of tubes, the receiver having first and second receiver slots, each of the first and second receiver slots formed by spaced apart receiver fingers, the spacing of the receiver fingers forming the first receiver slot different than the spacing of the receiver fingers forming the second receiver slot for receiving different sizes and types of fasteners in each of the first and second receiver slots; and
transferring the fasteners in the desired orientation from the receiver to the fastener installation device using a plurality of injector blades.

10. The method of claim 9, further comprising aligning one of the tubes with one of the first and second receiver slots.

11. The method of claim 9, wherein the transferring step comprises extending the plurality of injector blades into the first and second receiver slots to transfer the fasteners from the receiver to the fastener installation device.

12. The method of claim 9, further comprising aligning one of the first and second receiver slots with the fastener installation device.

13. The method of claim 9, further comprising moving the receiver from a first position adjacent an exit of the tubes to a second position clear of the exit of the tubes for purging the fasteners from the tubes.

14. The method of claim 9, further comprising aligning the fasteners with one of the first and second receiver slots using a slot formed in the tubes, the slot adapted to receive a shank of the fasteners.

15. A fastener injector comprising:
a plurality of tubes, each tube sized to transfer different sizes and types of fasteners in a desired orientation;
a receiver having first and second receiver slots, each of the first and second receiver slots formed by spaced apart receiver fingers, the spacing between the receiver fingers forming the first receiver slot different than the spacing between the receiver fingers forming the second receiver slot, the spacings between the receiver fingers sized to receive and retain different sizes and types of fasteners from the tubes in each of the first and second receiver slots; and
a plurality of injector blades operable to transfer the fasteners in the desired orientation from the receiver to a fastener installation device.

16. The injector of claim 15, wherein at least one of the tubes includes a slot operable to align the fasteners with one of the first and second receiver slots.

17. The injector of claim 15, wherein the plurality of injector blades is operable to extend into the first and second receiver slots to deliver the fasteners to the fastener installation device.

18. The injector of claim 15, wherein at least one of the tubes is further operable to transfer a range of sizes and types of fasteners in the desired orientation.

19. The injector of claim 15, further comprising:
a first power supply operable to move the tubes to align one of the tubes with one of the first and second receiver slots; and
a second power supply operable to move the receiver to align one of the first and second receiver slots with the fastener installation device.

20. The injector of claim 19, further comprising a third power supply operable to move the receiver from a first position adjacent an exit of the tubes to a second position clear of the exit of the tubes.

* * * * *